US010344700B2

(12) United States Patent
Yamasaki et al.

(10) Patent No.: US 10,344,700 B2
(45) Date of Patent: Jul. 9, 2019

(54) ENGINE CONTROL DEVICE (71) Applicant: MAZDA MOTOR CORPORATION, Hiroshima (JP)

(72) Inventors: Atsushi Yamasaki, Hiroshima (JP); Kyohei Yasuda, Irvine, CA (US)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 15/514,803

(22) PCT Filed: Nov. 26, 2015

(86) PCT No.: PCT/JP2015/083274
§ 371 (c)(1),
(2) Date: Mar. 27, 2017

(87) PCT Pub. No.: WO2016/088649
PCT Pub. Date: Jun. 9, 2016

(65) Prior Publication Data
US 2017/0226953 A1    Aug. 10, 2017

(30) Foreign Application Priority Data

Dec. 5, 2014  (JP) ................................ 2014-246451

(51) Int. Cl.
*F02D 13/02* (2006.01)
*F02D 41/06* (2006.01)
(Continued)

(52) U.S. Cl.
CPC ..... *F02D 41/3076* (2013.01); *F02D 13/0234* (2013.01); *F02D 19/0655* (2013.01);
(Continued)

(58) Field of Classification Search
CPC .... F02D 41/3076; F02D 41/38; F02D 41/402; F02D 41/405; F02D 41/06; F02D 41/062;
(Continued)

(56) References Cited

U.S. PATENT DOCUMENTS

2002/0026924 A1* 3/2002 Morikawa ................. F02B 1/12
123/305
2012/0216776 A1* 8/2012 Nagatsu ................ F02B 23/101
123/305
2015/0059686 A1* 3/2015 Glugla ............... F02M 21/0284
123/299

FOREIGN PATENT DOCUMENTS

JP    2009-114942 A    5/2009
JP    2010-285906 A    12/2010
(Continued)

OTHER PUBLICATIONS

International Search Report issued in PCT/JP2015/083274; dated Feb. 2, 2016.

*Primary Examiner* — George C Jin
(74) *Attorney, Agent, or Firm* — Studebaker & Brackett PC (57) ABSTRACT A control device of the present invention is applied to an engine provided with a fuel injection valve which directly injects fuel into a combustion chamber. The control device includes a pre-ignition prediction unit which predicts occurrence of pre-ignition when the engine is started; and an injection control unit which causes fuel to be injected in an expansion stroke from the fuel injection valve when occurrence of pre-ignition is predicted by the pre-ignition prediction unit. Thus, it is possible to prevent pre-ignition without lowering the effective compression ratio.

11 Claims, 5 Drawing Sheets (51) Int. Cl.
  *F02D 41/30* (2006.01)
  *F02D 19/06* (2006.01)
  *F02D 41/40* (2006.01)
  *F02D 19/08* (2006.01)
  *F02D 35/02* (2006.01)
  *F02D 41/38* (2006.01)
  *F02D 41/14* (2006.01)

(52) U.S. Cl.
  CPC ......... *F02D 19/084* (2013.01); *F02D 35/027* (2013.01); *F02D 41/062* (2013.01); *F02D 41/38* (2013.01); *F02D 41/401* (2013.01); *F02D 35/026* (2013.01); *F02D 41/402* (2013.01); *F02D 2041/1412* (2013.01); *F02D 2041/389* (2013.01); *F02D 2200/0611* (2013.01); *Y02T 10/18* (2013.01); *Y02T 10/36* (2013.01); *Y02T 10/44* (2013.01)

(58) Field of Classification Search
  CPC ............... F02D 35/027; F02D 13/0234; F02D 2041/389; F02D 19/084; F02D 19/082; F02D 19/085
  See application file for complete search history.

(56) References Cited

FOREIGN PATENT DOCUMENTS

| | | |
|---|---|---|
| JP | 2013-224621 A | 10/2013 |
| JP | 2014-141918 A | 8/2014 |

\* cited by examiner

ENGINE CONTROL DEVICE

TECHNICAL FIELD

The present invention relates to a control device which controls an engine in such a manner as to prevent occurrence of pre-ignition.

BACKGROUND ART

Among engines, there is an engine capable of using fuel containing alcohol such as ethanol. When fuel containing alcohol is used, it is possible to increase the engine efficiency by increasing the effective compression ratio because the octane number of fuel containing alcohol is high. On the other hand, as the alcohol concentration is increased, vaporization performance of fuel is deteriorated. This may deteriorate the cold start performance. In view of the above, Patent Literature 1 discloses directly injecting fuel into a cylinder in a latter stage of a compression stroke in which the in-cylinder temperature is increased when an engine is started in a cold state.

When fuel is changed from fuel having a high alcohol concentration to fuel having a poor property (e.g. fuel having a low alcohol concentration, or fuel containing only gasoline having a poor property) while keeping the effective compression ratio unchanged, pre-ignition is likely to occur. In particular, when an engine is started after an ignition switch is turned on from a state that the engine is stopped, a lead time for self-ignition increases in a predetermined low speed range (e.g. 200 rpm) when fuel injection is started. This may likely to cause pre-ignition.

Particularly, some of the vehicles may be used in a district where only the fuel having a poor property is available. In view of the above, how to prevent pre-ignition is a task to be solved. Note that in the aspect of preventing pre-ignition, for instance, it is proposed to operate a valve timing variable mechanism (means for changing an opening/closing timing of an intake valve) when occurrence of pre-ignition is predicted for lowering the effective compression ratio. However, a valve timing variable mechanism of a hydraulically driven type cannot secure an operation thereof unless an engine is started. Therefore, if a valve timing variable mechanism is of a hydraulically driven type, it may be impossible to lower the effective compression ratio at a start time of the engine when pre-ignition is likely to occur.

CITATION LIST

Patent Literature

Patent Literature 1: Japanese Unexamined Patent Publication No. 2013-224621

SUMMARY OF INVENTION

In view of the aforementioned circumstances, an object of the present invention is to provide an engine control device which enables to prevent pre-ignition without lowering the effective compression ratio.

In order to achieve the aforementioned object, the present invention is directed to a device for controlling an engine provided with a fuel injection valve which directly injects fuel into a combustion chamber. The engine control device includes a pre-ignition prediction unit which predicts occurrence of pre-ignition when the engine is started; and an injection control unit which causes fuel to be injected in an expansion stroke from the fuel injection valve when occurrence of pre-ignition is predicted by the pre-ignition prediction unit.

DESCRIPTION OF EMBODIMENTS

Figure 1:
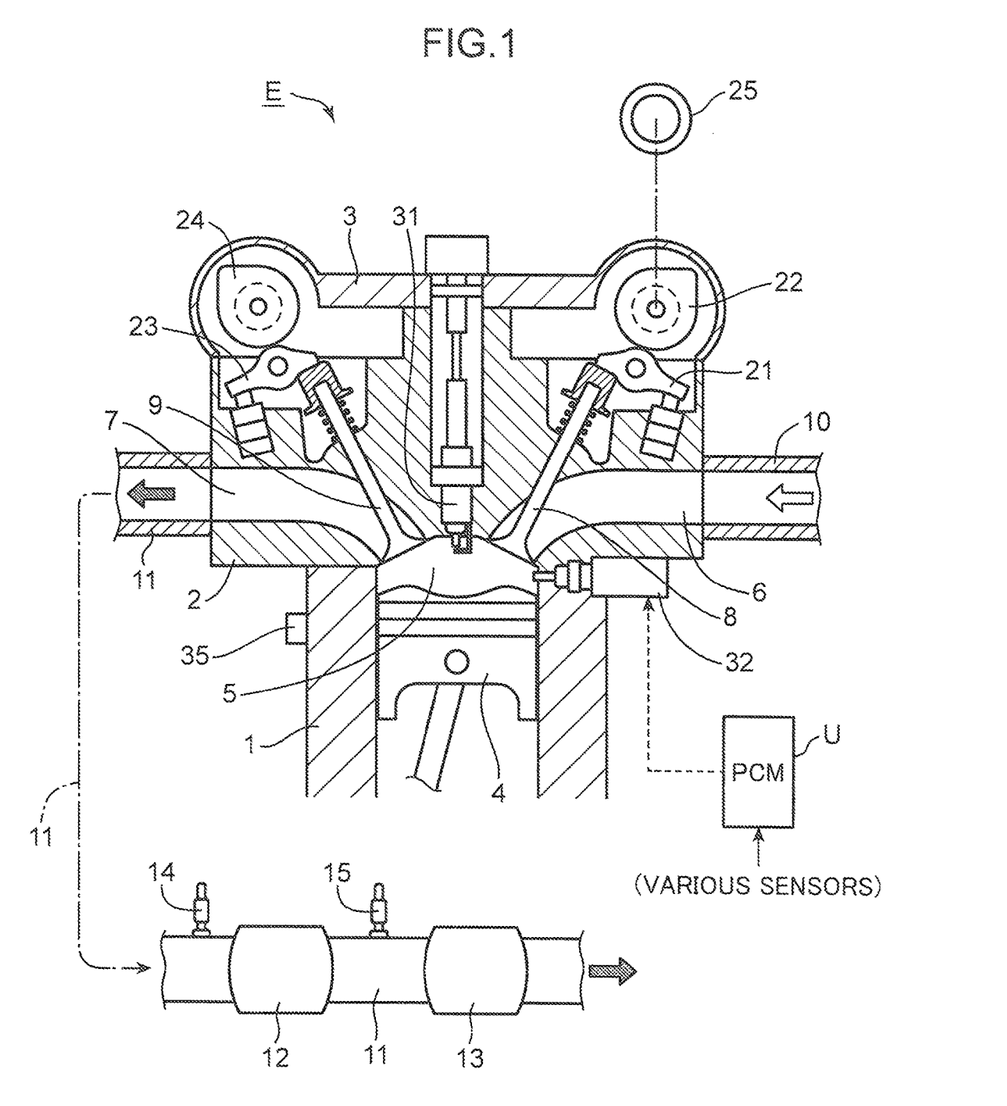
FIG. 1 is a sectional view illustrating an example of an engine to which the present invention is applied.

An engine E illustrated in FIG. 1 is a multi-cylinder engine (in the embodiment, a 4-cylinder engine) for an automobile. In FIG. 1, the reference numeral 1 denotes a cylinder block, the reference numeral 2 denotes a cylinder head, and the reference numeral 3 denotes a cylinder head cover. A piston 4 is slidably received in the cylinder block 1. A combustion chamber 5 is formed in a space above the piston 4.

An intake port 6 is opened and an exhaust port 7 is opened in the combustion chamber 5. The intake port 6 is opened and closed by an intake valve 8, and the exhaust port 7 is opened and closed by an exhaust valve 9. An intake passage 10 is connected to the intake port 6. Further, an exhaust passage 11 is connected to the exhaust port 7.

A first exhaust gas purification catalyst 12 and a second exhaust gas purification catalyst 13 are connected to the exhaust passage 11 in this order from an upstream side of the exhaust passage 11 to a downstream side thereof. A linear $O_2$ sensor 14 is connected to the upstream side of the exhaust passage 11 with respect to the first exhaust gas purification catalyst 12. Further, a lambda $O_2$ sensor 15 is connected between the first and second exhaust gas purification catalysts 12 and 13 on the exhaust passage 11.

The intake valve 8 is driven to be opened and closed by a camshaft 22 via a locker arm 21. Further, the exhaust valve 9 is driven to be opened and closed by a camshaft 24 via a locker arm 23. A hydraulically driven valve timing variable mechanism 25 is disposed at an end of the camshaft 22 for the intake valve 8. The valve timing variable mechanism 25 is configured to change particularly a closing timing of the intake valve 8. When hydraulic oil is not supplied, the intake valve 8 is fixed to a position where the intake amount is largest. As the amount of hydraulic oil to be supplied is increased, the intake valve 8 is closed at a retarded timing, whereby the intake amount is reduced.

In the cylinder head 2, an ignition plug 31 and a fuel injection valve 32 are disposed to face the combustion chamber 5. In this way, the engine E is configured as a direct-injection engine which directly injects fuel into a cylinder (into the combustion chamber 5) from the fuel injection valve 32, and is configured as a spark-ignition engine. Further, the engine E is designed based on the premise that gasoline containing alcohol (particularly, ethanol) is used as fuel. In view of the above, the geometric compression ratio is set large (e.g. from 13 to 14).

In FIG. 1, the symbol U denotes a controller, which is configured with use of a microcomputer (PCM: Powertrain Control Module). The controller U is configured to predict occurrence of pre-ignition and to control changing a fuel injection timing, as will be described later. Specifically, the controller U basically controls the fuel injection valve 32 in such a manner as to inject fuel in an intake stroke, and to retard a fuel injection timing up to an expansion stroke when occurrence of pre-ignition is predicted. In order to implement the control, the controller U includes various modules M1 to M7 illustrated in FIG. 3 and FIG. 4, and receives a signal from a knock sensor 35 mounted on the cylinder block 1 and signals from various other sensors.

Figure 3:
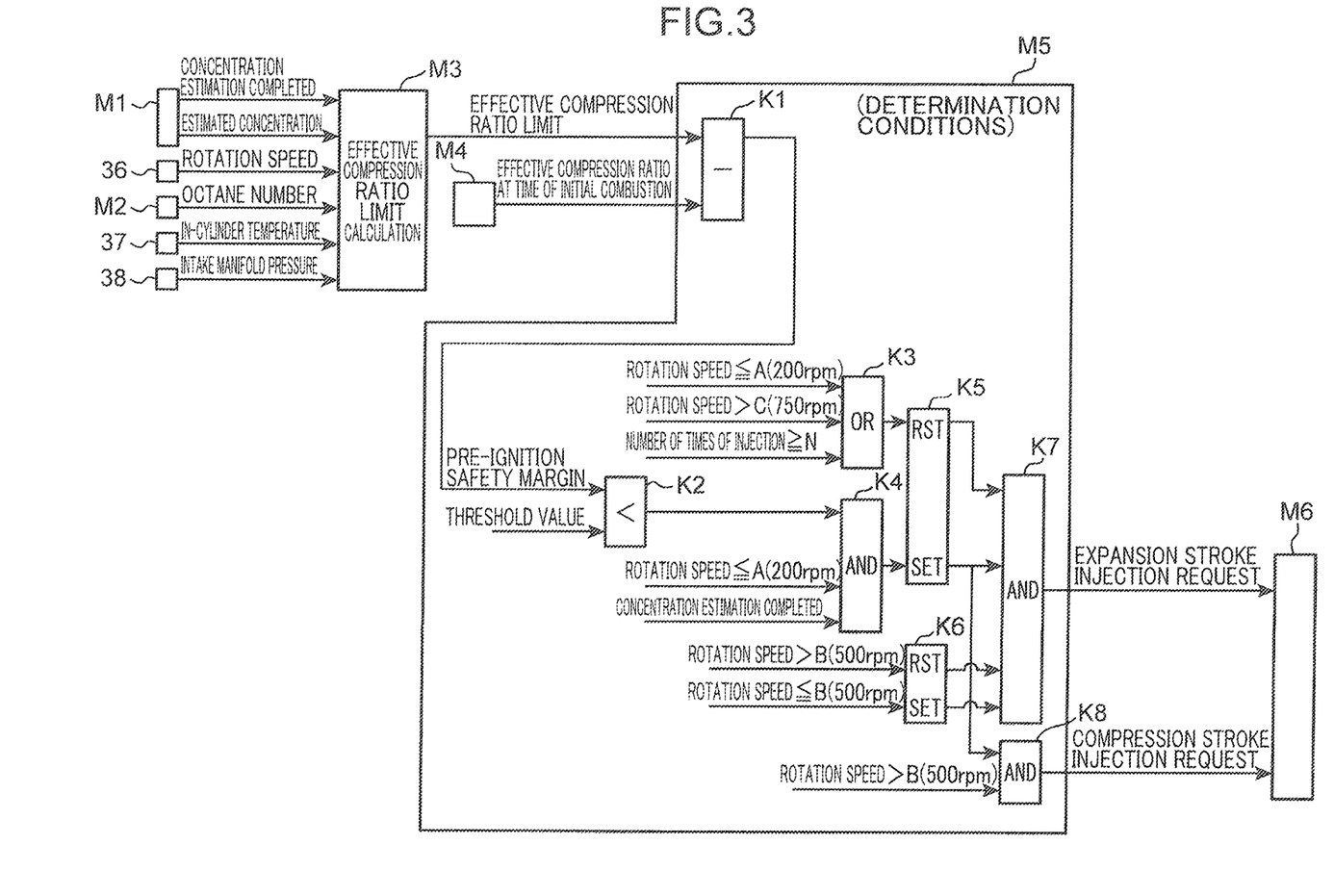
FIG. 3 is a diagram illustrating an example of a control system of the present invention.

Specifically, the controller U includes the first estimation unit M1 which estimates a concentration of alcohol contained in fuel, the second estimation unit M2 which estimates an octane number of fuel, the first calculation unit M3 which calculates an effective compression ratio limit, which is an upper limit of the effective compression ratio at which pre-ignition does not occur, the second calculation unit M4 which calculates an effective compression ratio on the basis of an operating condition of the engine, the prediction unit M5 which predicts occurrence of pre-ignition when the engine is started, the control unit M6 which controls an operation of the fuel injection valve 32, and the storage unit M7 which stores a knock index value representing a degree of likelihood of occurrence of knocking while updating the knock index value. Note that the first estimation unit M1 corresponds to "a concentration specifying unit" in the claims, the second estimation unit M2 corresponds to "an octane number estimation unit" in the claims, the first calculation unit M3 corresponds to "an effective compression ratio limit calculation unit" in the claims, the prediction unit M5 corresponds to "a pre-ignition prediction unit" in the claims, the control unit M6 corresponds to "an injection control unit" in the claims, and the storage unit M7 corresponds to "a knock index value storage unit" in the claims.

Further, in the respective units of the engine, there are provided a rotation speed sensor 36 which detects a rotation speed of the engine, an in-cylinder temperature sensor 37 which detects an in-cylinder temperature of the engine (an internal temperature of the combustion chamber 5), and an intake manifold pressure sensor 38 which detects a pressure of intake air flowing through the intake passage 10 of the engine. Detection signals from the sensors 36, 37, and 38 are input to the controller U.

Figure 2:
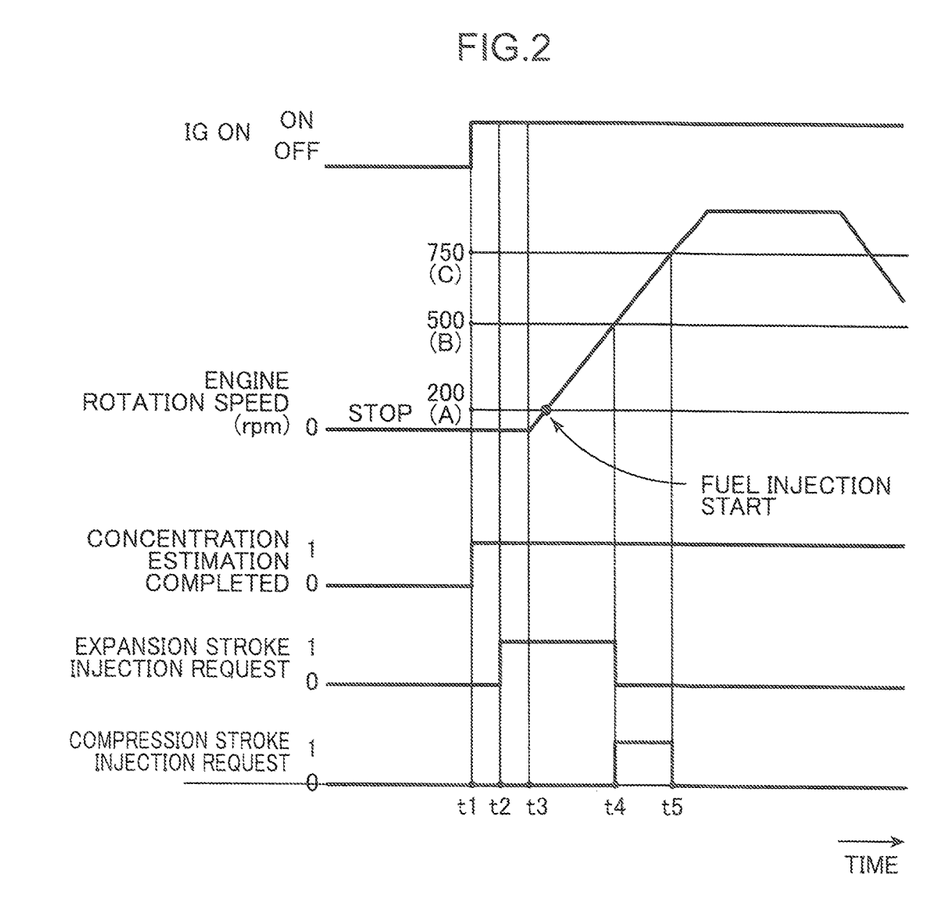
FIG. 2 is a time chart illustrating a control example of the present invention.

In this example, a summary of control in the embodiment is described referring to FIG. 2 by focusing on a fuel injection timing. Note that pre-ignition is likely to occur immediately after a first time fuel injection (in other words, at a time of initial combustion) in an engine starting process. Specifically, in the embodiment, fuel injection is started when a cranking speed by a starter motor reaches a first predetermined value A (in the embodiment, 200 rpm) at which a fuel pressure is sufficiently increased. Therefore, pre-ignition is likely to occur immediately after the cranking speed reaches the first predetermined value A. In view of the above, the controller U predicts whether or not pre-ignition occurs when fuel is injected at the first predetermined value A during a period until the cranking speed reaches the first predetermined value A after cranking is started. Further, when occurrence of pre-ignition is predicted, fuel injection is performed not in an intake stroke but in an expansion stroke in which pre-ignition can be completely prevented.

For instance, it is assumed that an ignition switch is turned on at the point of time t1 in FIG. 2, and occurrence of pre-ignition is predicted at the point of time t2. Then, an execution flag indicating that an expansion stroke injection of injecting fuel in an expansion stroke should be executed is set to 1 at the point of time t2. The engine rotation speed is increased from the point of time t3 by a cranking operation, and at a point of time when the engine rotation speed reaches the first predetermined value A i.e. 200 rpm, an expansion stroke injection is executed as a first time fuel injection after the ignition switch is turned on. In this way, it is possible to prevent pre-ignition by a first time fuel injection at which pre-ignition is most likely to occur. Note that a timing of an expansion stroke injection is in the range of from 4 degrees to 8 degrees after the piston reaches the compression top dead center position in terms of crank angle, and in the embodiment, is set to 6 degrees. Specifically, an injection timing as close as possible to the compression top dead center position is selected from an aspect that the adhesion amount of fuel to a top surface of the piston 4 can be reduced even if fuel is injected in an expansion stroke, and that a torque can be secured as much as possible.

The engine E rotates by itself by fuel injection, and at the point of time t4, the engine rotation speed is increased up to a second predetermined value B (500 rpm). At a time when the engine rotation speed reaches the second predetermined value B, pre-ignition no longer occurs. In view of this, the execution flag of expansion stroke injection is reset to 0, and an execution flag indicating that a compression stroke injection of injecting fuel in a compression stroke should be executed is set to 1. Thus, after the point of time t4, not an expansion stroke injection but a compression stroke injection is executed. A timing of a compression stroke injection is set in the range of from 30 degrees to 50 degrees before the piston reaches the compression top dead center position in terms of crank angle, and in the embodiment, is set to 40 degrees. Specifically, the aforementioned injection timing is selected in such a manner that the combustion chamber 5 is sufficiently cooled by heat of vaporization of injected fuel, and that fuel is sufficiently homogenized.

Shift from an expansion stroke injection to a compression stoke injection is not performed in such a manner that the injection timing is gradually shifted toward a compression stroke side, but is performed instantaneously. For instance, fuel injection is instantaneously switched from fuel injection at a timing corresponding to around 6 degrees after the piston reaches the compression top dead center position to fuel injection at a timing corresponding to around 40 degrees before the piston reaches the compression top dead center position. In this way, it is possible to prevent an increase in the adhesion amount of fuel to a top surface of the piston 4, and to speedily shift fuel injection to a compression stroke injection.

At the point of time t5 at which the engine rotation speed is further increased, the engine rotation speed reaches a third predetermined value C (e.g. 750 rpm). After the point of time t5, the execution flag of compression stroke injection is reset to 0. Thereafter, an intake stroke injection of injecting fuel in an intake stroke is executed. Specifically, control is shifted from fuel injection control for engine start to normal fuel injection control for idling. Note that the idling speed is, for instance, from 600 to 650 rpm.

As described above, when occurrence of pre-ignition is predicted, the occurrence of pre-ignition is prevented by performing an expansion stroke injection. After the expansion stroke injection is performed, fuel injection is speedily shifted to a compression stroke injection. In this way, minimizing a period during which an expansion stroke injection is performed makes it possible to minimize a period during which a torque decreases, or a discharge amount of unburnt fuel increases.

Further, providing a compression stroke injection between an expansion stroke injection and an intake stroke injection makes it possible to cool the combustion chamber 5 before ignition by vaporization of injected fuel. This makes it possible to reduce the risk of occurrence of pre-ignition thereafter, and to secure a torque. In addition to the above, in the case of a multi-cylinder engine (e.g. a 4-cylinder engine), in which combustion in the respective cylinders is performed in a predetermined combustion order (an ignition order), it is possible to perform combustion in a cylinder whose combustion order is next to a cylinder in which an expansion stroke injection is performed by performing a compression stroke injection. This makes it possible to speedily increase the engine rotation speed. Specifically, when it is assumed that a last expansion stroke injection is performed for a certain cylinder, a cylinder whose combustion order is next to the certain cylinder is already in a compression stroke at the point of time when the last expansion stroke injection is performed for the certain cylinder. Therefore, even if fuel injection is attempted to instantaneously switch to an intake stroke injection after the expansion stroke injection, the cylinder whose combustion order is next to the certain cylinder already loses an opportunity for the intake stroke injection. In this case, combustion is performed only for a cylinder whose combustion order is second next to the certain cylinder. In this way, it is not preferable to instantaneously switch fuel injection from an expansion stroke injection to an intake stroke injection in a point that an increase in the engine rotation speed is lowered. On the other hand, when a compression stroke injection is provided between an expansion stroke injection and an intake stroke injection as described in the embodiment, it is possible to speedily increase the engine rotation speed because fuel injection is not disrupted.

Next, an example of discrimination control for discriminating whether an expansion stroke injection is to be executed or a compression stroke injection is to be executed is described referring to FIG. 3.

A signal indicating that estimation of a concentration of alcohol contained in fuel is completed, and a value of the estimated concentration are input from the first estimation unit M1 to the first calculation unit M3. Further, an engine rotation speed detected by the rotation speed sensor 36, an octane number of fuel estimated by the second estimation unit M2, an in-cylinder temperature detected by the in-cylinder temperature sensor 37, and an intake manifold pressure (an intake pressure) detected by the intake manifold pressure sensor 38 are input to the first calculation unit M3. Note that in the embodiment, an intake manifold pressure is used in place of an in-cylinder pressure.

The first calculation unit M3 calculates an effective compression ratio limit at the time of initial combustion of the engine on the basis of the aforementioned various input values. Specifically, an upper limit of an effective compression ratio at which pre-ignition does not occur when the engine rotation speed is increased up to the first predetermined value A (200 rpm) and a first time fuel injection is performed is specified, and the specified upper limit of the effective compression ratio is calculated as an effective compression ratio limit. For instance, the first calculation unit M3 calculates an effective compression ratio limit by performing calculation using a polynomial expression model, in which an intake manifold pressure is set as a variable, and an engine rotation speed, an octane number, an in-cylinder temperature, and a fuel injection timing are set as constants. Note that for this calculation, it is possible to use the technique described in Japanese Unexamined Patent Publication No. 2012-52472 as it is. Therefore, further description about calculation of an effective compression ratio limit is omitted.

According to the aforementioned polynomial expression model, the higher the octane number is, the larger the value of the effective compression ratio limit is. On the other hand, according to the map of FIG. 4 to be described later, the higher the octane number is, the higher the alcohol concentration is. This means that the higher the alcohol concentration is, the higher the effective compression ratio limit is.

It is possible to estimate an estimated concentration value of alcohol to be input from the first estimation unit M1 to the first calculation unit M3, for instance, on the basis of an output value of the linear $O_2$ sensor 14. Note that there are known various other methods, as a method for estimating an alcohol concentration. Therefore, it is needless to say that a method for estimating an alcohol concentration is not limited to the method using the linear $O_2$ sensor 14.

Figure 4:
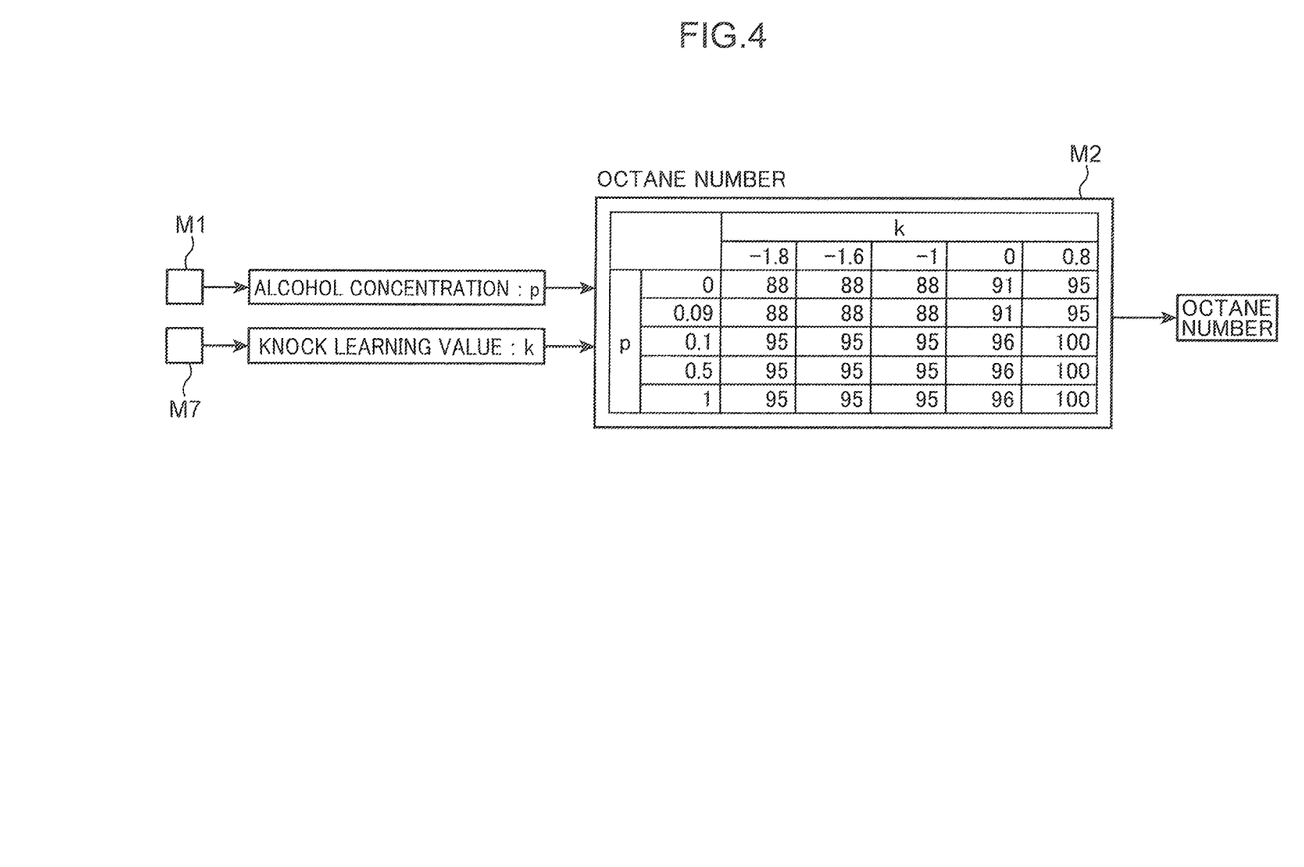
FIG. 4 is a diagram illustrating a map for use in determining the octane number from an alcohol concentration and a knock index value.

Further, as illustrated in FIG. 4, for instance, it is possible to estimate an octane number to be input from the second estimation unit M2 to the first calculation unit M3 with use of a map in which an alcohol concentration (p) to be input from the first estimation unit M1, and a knock index value (k) to be input from the storage unit M7 are set as parameters. In the embodiment, the knock index value (k) is a deviation when a predetermined control parameter is changed with respect to a reference value in order to prevent knocking. Specifically, the controller U avoids continuous occurrence of knocking by changing a predetermined control parameter (e.g. an ignition timing or an effective compression ratio), which may affect knocking in such a direction as to suppress knocking when knocking is detected by the knock sensor 35. The knock index value (k) is a deviation between a value of a control parameter when the control parameter is changed to a value at which knocking does not occur, and a reference value of the control parameter, which is determined in advance for each of conditions such as an engine load or an engine rotation speed. Note that knocking is likely to occur, as a control parameter is greatly changed to such a direction as to suppress knocking. Therefore, it is possible to regard a degree of deviation (a knock index value) between the control parameter and a reference value, as an index representing a degree of likelihood of occurrence of knocking (or a degree of unlikelihood of occurrence of knocking). The storage unit M7 stores the knock index value having the aforementioned characteristics while successively updating the knock index value during an operation of the engine.

The second calculation unit M4 calculates an effective compression ratio at the time of initial combustion of the engine, in other words, an effective compression ratio to be set when the engine rotation speed is equal to the first predetermined value A (200 rpm). The effective compression ratio at the time of initial combustion of the engine is an effective compression ratio to be determined on the basis of a closing timing of the intake valve 8, which is set when hydraulic oil is not supplied to the valve timing variable mechanism 25, and is a value that is determined without depending on a property of fuel.

The prediction unit M5 functionally includes determination units K1 to K8 for predicting pre-ignition. The determination unit K1 calculates a deviation between an effective compression ratio limit calculated by the first calculation unit M3, and an effective compression ratio calculated by the second calculation unit M4, in other words, a value obtained by subtracting the latter value from the former value, as a pre-ignition safety margin. In other words, a pre-ignition safety margin is a degree indicating how close an actual effective compression ratio when the engine rotation speed is increased up to the first predetermined value A (200 rpm) and a first time fuel injection is performed (i.e. at the time of initial combustion) is with respect to an upper limit of an effective compression ratio (an effective compression ratio limit) at which pre-ignition does not occur at the time of initial combustion.

The determination unit K2 compares the pre-ignition safety margin determined by the determination unit K1, and a predetermined threshold value. Further, when the pre-ignition safety margin is smaller than the threshold value, a signal indicating that occurrence of pre-ignition is predicted to the determination unit K4. Specifically, a fact that a pre-ignition safety margin is small means that an effective compression ratio at the time of initial combustion is close to a limit value (an effective compression ratio limit) taking into consideration pre-ignition, and that a probability of occurrence of pre-ignition is high. Therefore, when a pre-ignition safety margin is smaller than the threshold value, it is predicted that pre-ignition occurs. In other words, processing by the determination unit K2 corresponds to determination processing as to whether or not a probability of occurrence of pre-ignition is high when the engine is started.

The determination unit K4 is an AND circuit. When three conditions i.e. a condition that occurrence of pre-ignition is predicted by the determination unit K2, a condition that the engine rotation speed is equal to or smaller than the first predetermined value A (200 rpm), and a condition that estimation of an alcohol concentration is finished are satisfied, the determination unit K4 outputs a SET signal for bringing the determination unit K5 constituted by an AND circuit to a "SET" state. Note that the SET signal corresponds to a signal indicating that fuel should be injected in an expansion stroke.

In response to receiving a set signal from the determination unit K4, the determination unit K5 outputs a SET signal to the determination unit K7 constituted by an AND circuit. On the other hand, in response to an input of an RST signal (a reset signal) from the determination unit K3, the determination unit K5 outputs an RST signal to the determination unit K7. The determination unit K3 is an OR circuit. When one of three conditions i.e. a condition that a signal (an edge signal) indicating that the engine rotation speed is equal to or smaller than the first predetermined value A (200 rpm) is input, a condition that a signal indicating that the engine rotation speed is larger than the third predetermined value C (750 rpm) is input, and a condition that a count value of the number of times of injection from start of fuel injection is equal to or larger than a predetermined number of times N is satisfied, the determination unit K3 outputs an RST signal to the determination unit K5.

When a signal indicating that the engine rotation speed is larger than the second predetermined value B (500 rpm) is input, the determination unit K6 outputs an RST signal to the determination unit K7. On the other hand, when a signal indicating that the engine rotation speed is equal to or smaller than the second predetermined value B (500 rpm) is input, the determination unit K6 outputs a SET signal to the determination unit K7.

The determination unit K7 outputs a request signal indicating that fuel should be injected in an expansion stroke to the control unit M6 when both of the conditions that a SET signal is input from the determination unit K5 and that a SET signal is input from the determination unit K6 are satisfied. The control unit M6 controls the fuel injection valve 32 to inject fuel in an expansion stroke in response to the request signal.

The determination unit K8 outputs a request signal indicating that fuel should be injected in a compression stroke to the control unit M6 when both of a condition that a signal indicating that the engine rotation speed is larger than the second predetermined value B (500 rpm) is input, and a condition that a SET signal from the determination unit K5 is already input before the input of the aforementioned signal are satisfied. The control unit M6 controls the fuel injection valve 32 to inject fuel in a compression stroke in response to the request signal.

By the aforementioned control, fuel is injected in an expansion stroke when the engine rotation speed is in a range of not smaller than the first predetermined value A but not larger than the second predetermined value B (not smaller than 200 rpm but not larger than 500 rpm); and fuel is injected in a compression stroke in a range of not smaller than the second predetermined value B but not larger than the third predetermined value C (not smaller than 500 rpm but not larger than 750 rpm). Further, when the engine rotation speed exceeds the third predetermined value C (750 rpm) or when the number of times of fuel injection is equal to or larger than a predetermined number of times N, fuel injection is switched from fuel injection in a compression stroke to fuel injection in an intake stroke (the switching is not gradually performed but is instantaneously performed).

Figure 5:
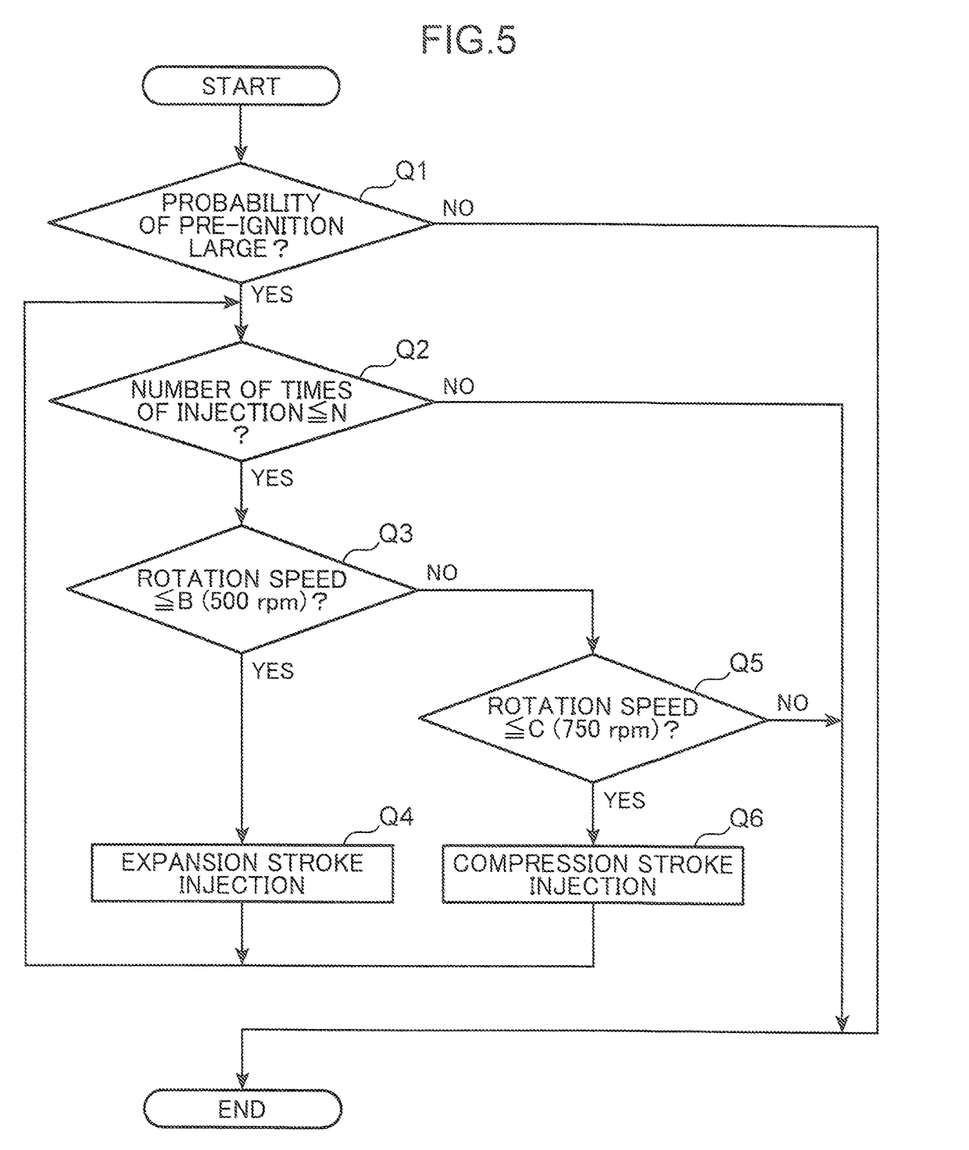
FIG. 5 is a flowchart illustrating a control example of the present invention.

FIG. 5 illustrates a flowchart for performing the control as illustrated in FIG. 3. In the following, the control is described referring to FIG. 5. In the following description, the symbol Q denotes a step. When an ignition switch is turned on, and the control of FIG. 3 is started, first of all in Q1, it is determined whether or not there is a probability of occurrence of pre-ignition at the time of initial combustion, namely, when the engine rotation speed reaches the first predetermined value A (200 rpm). When the determination result of Q1 is YES, in Q2, it is determined whether or not the number of times of injection is equal to or smaller than the predetermined number of times N (e.g. four times) when it is assumed that fuel injection at the time of initial combustion is the first time fuel injection. When the determination result of Q2 is YES, in Q3, it is determined whether or not the engine rotation speed is equal to or smaller than the second predetermined value B (500 rpm). When the determination result of Q3 is YES, in Q4, an expansion stroke injection is selected. Specifically, a flag (see FIG. 2) indicating that fuel should be injected in an expansion stroke is set to 1.

When the determination result of Q3 is NO, in Q5, it is determined whether or not the engine rotation speed is equal to or smaller than the third predetermined value C (750 rpm). When the determination result of Q5 is YES, in Q6, a compression stroke injection is selected. Specifically, a flag (see FIG. 2) indicating that fuel should be injected in a compression stroke is set to 1.

When the determination result of Q5 is NO, or when the determination result of Q2 is NO, or when the determination result of Q1 is NO, the control is returned without via Q4 or Q6. This makes it possible to select an intake stroke injection of injecting fuel in an intake stroke as usual.

Note that although not illustrated in the flowchart of FIG. 5, there is a case that pre-ignition prediction processing (Q1) cannot be performed before the engine rotation speed reaches 200 rpm, in other words, a case that pre-ignition prediction is not completed at the time of initial combustion.

In this case, an expansion stroke injection is selected at least as a first time fuel injection for safety measures.

In the foregoing, the embodiment is described. The present invention, however, is not limited to the embodiment. It is possible to modify the present invention as necessary as far as the modification does not depart from the scope of the invention as claimed in the claims. For instance, alcohol contained in fuel may be methanol or the like, in place of ethanol. An alcohol concentration may be specified by directly detecting a concentration of alcohol with use of an alcohol concentration sensor.

It is possible to modify the engine rotation speed (in the embodiment, 200 rpm) when fuel injection is performed for the first time when the engine is started (at the time of initial combustion), or to modify the engine rotation speed (in the embodiment, 500 rpm) when fuel injection is switched from an expansion stroke injection to a compression stroke injection, or to modify the engine rotation speed (in the embodiment, 750 rpm) when fuel injection is switched from a compression stroke injection to an intake stroke injection, as necessary, according to characteristics or the like of the engine E.

Switching from an expansion stroke injection to a compression stroke injection may be performed without depending on the engine rotation speed, but depending only on the number of times of injection from the time of initial combustion. Specifically, for instance, it is possible to switch to a compression stroke injection after fuel injection is performed one time (or two times), and to switch to an intake stroke injection after a compression stroke injection is performed one time (or two times). Note that normally, the engine rotation speed is increased up to around 500 rpm by a first time fuel injection (and combustion thereafter). In this way, it is possible to securely increase the engine rotation speed to 500 rpm or more by a second time fuel injection (and combustion thereafter).

As a pre-ignition safety margin, it is possible to use any parameter capable of measuring a degree of likelihood of pre-ignition at the time of initial combustion when first fuel is injected. For instance, it is possible to calculate a pre-ignition safety margin with use of a certain physical amount, which is associated with an effective compression ratio at the time of initial combustion.

A time of predicting occurrence of pre-ignition is not limited to the time of initial combustion when first fuel is injected. It is possible to predict pre-ignition in the same manner as described above when fuel injection is performed at a second time.

The number of cylinders of the engine E is not limited to four. The number of cylinders may be set to an arbitrary number such as three, six, or eight.

Further, the present invention may also be defined as a method for controlling an engine. It is needless to say that an object of the present invention is not limited to the explicitly described object, but may implicitly include providing substantially preferable or advantageous effects.

Lastly, the features and the advantageous effects disclosed in the embodiment will be briefly described.

A control device disclosed in the embodiment is applied to an engine provided with a fuel injection valve which directly injects fuel into a combustion chamber. The control device includes a pre-ignition prediction unit which predicts occurrence of pre-ignition when the engine is started; and an injection control unit which causes fuel to be injected in an expansion stroke from the fuel injection valve when occurrence of pre-ignition is predicted by the pre-ignition prediction unit.

According to the aforementioned configuration, fuel is injected in an expansion stroke when occurrence of pre-ignition is predicted. This makes it possible to shorten a period from fuel injection to ignition, in other words, a period during which the injected fuel receives heat. This is advantageous in preventing pre-ignition.

Preferably, the pre-ignition prediction unit may predict whether or not pre-ignition occurs at least at a time of initial combustion when a first time fuel injection is performed after an ignition switch is turned on.

According to the aforementioned configuration, it is possible to prevent pre-ignition at the time of initial combustion when pre-ignition is particularly likely to occur.

Preferably, the control device may further include a concentration specifying unit which estimates or detects a concentration of alcohol contained in fuel. The pre-ignition prediction unit may predict occurrence of pre-ignition when an effective compression ratio of the engine to be set at the time of initial combustion is close to a predetermined limit value of the effective compression ratio. The limit value may be set to a larger value, as the alcohol concentration detected by the concentration specifying unit is increased.

The higher the alcohol concentration of fuel is, the higher the octane number is, and pre-ignition is less likely to occur. Therefore, setting a limit value of the effective compression ratio higher as the alcohol concentration is increased as described above, and predicting pre-ignition on the basis of the limit value makes it possible to prevent an inconvenience that an expansion stroke injection is performed unnecessarily.

Preferably, when prediction by the pre-ignition prediction unit is not finished by the time of initial combustion, the injection control unit may cause first fuel to be injected in an expansion stroke.

According to the aforementioned configuration, it is possible to select an expansion stroke injection any time when prediction of pre-ignition is not performed by the time of initial combustion. This is advantageous in securely preventing pre-ignition.

Preferably, when occurrence of pre-ignition is not predicted by the pre-ignition prediction unit, the injection control unit may cause first fuel to be injected in an intake stroke.

According to the aforementioned configuration, an intake stroke injection is performed at a normal time when pre-ignition does not occur. Therefore, the aforementioned configuration is preferable in the aspect of fuel economy, securing a torque, and providing emission countermeasures.

Preferably, the engine may include a hydraulically driven valve timing variable mechanism which changes an opening/closing timing of an intake valve.

According to the aforementioned configuration, it is possible to appropriately set the opening/closing timing of the intake valve according to an operating condition of the engine by the hydraulically driven valve timing variable mechanism. In this case, it may not be possible to sufficiently supply hydraulic oil when the engine is started. This may make it difficult to lower the effective compression ratio by the valve timing variable mechanism, which may lead to occurrence of pre-ignition. However, in the aforementioned configuration, an expansion stroke injection is performed when pre-ignition is predicted. This makes it possible to prevent occurrence of pre-ignition by the expansion stroke injection.

Further, a control device of the embodiment is applied to an engine provided with a fuel injection valve which directly injects fuel into a combustion chamber, and capable of using fuel containing alcohol as fuel. The control device includes a concentration specifying unit which estimates or detects a concentration of alcohol contained in fuel; a knock index value storage unit which stores a knock index value while updating the knock index value, the knock index value being an index representing a degree of likelihood of occurrence of knocking; an octane number estimation unit which estimates an octane number of fuel on the basis of the alcohol concentration estimated or detected by the concentration specifying unit, and the knock index value stored in the knock index value storage unit; an effective compression ratio limit calculation unit which calculates an effective compression ratio limit on the basis of the octane number estimated by the octane number estimation unit, and an operating condition of the engine, the effective compression ratio limit being an upper limit of an effective compression ratio at which pre-ignition does not occur; and an injection control unit which controls the fuel injection valve in such a manner as to inject fuel in an expansion stroke for a predetermined period from a time of initial combustion, when an effective compression ratio to be set at the time of initial combustion of the engine is close to the effective compression ratio limit calculated by the effective compression ratio limit calculation unit.

In the aforementioned configuration, it is possible to provide a more specific device capable of obtaining the aforementioned advantageous effects.

The invention claimed is:

1. An engine control device for controlling an engine provided with a fuel injection valve which directly injects fuel into a combustion chamber, comprising:
   a pre-ignition prediction unit which predicts occurrence of pre-ignition when the engine is started; and
   an injection control unit which causes fuel to be injected in an expansion stroke from the fuel injection valve when occurrence of pre-ignition is predicted by the pre-ignition prediction unit and when a cranking operation is performed by a starter motor, wherein
   the pre-ignition prediction unit predicts whether or not pre-ignition occurs at least at a time of initial combustion when a first time fuel injection is performed after an ignition switch is turned on,
   the engine control device further comprising:
   a concentration specifying unit which estimates or detects a concentration of alcohol contained in fuel, wherein
   the pre-ignition prediction unit predicts occurrence of pre-ignition when an effective compression ratio of the engine to be set at the time of initial combustion is close to a predetermined limit value of the effective compression ratio, and
   the limit value is set to a larger value, as the alcohol concentration detected by the concentration specifying unit is increased.

2. The engine control device according to claim 1, wherein
   when prediction by the pre-ignition prediction unit is not finished by the time of initial combustion, the injection control unit causes first fuel to be injected in an expansion stroke.

3. The engine control device according to claim 2, wherein
   when occurrence of pre-ignition is not predicted by the pre-ignition prediction unit, the injection control unit causes first fuel to be injected in an intake stroke.

4. The engine control device according to claim 3, wherein
   the engine includes a hydraulically driven valve timing variable mechanism which changes an opening/closing timing of an intake valve.

5. An engine control device for controlling an engine provided with a fuel injection valve which directly injects fuel into a combustion chamber, comprising:
   a pre-ignition prediction unit which predicts occurrence of pre-ignition when the engine is started; and
   an injection control unit which causes fuel to be injected in an expansion stroke from the fuel injection valve when occurrence of pre-ignition is predicted by the pre-ignition prediction unit, wherein
   the pre-ignition prediction unit predicts whether or not pre-ignition occurs at least at a time of initial combustion when a first time fuel injection is performed after an ignition switch is turned on, and
   when prediction by the pre-ignition prediction unit is not finished by the time of initial combustion, the injection control unit causes first fuel to be injected in an expansion stroke.

6. The engine control device according to claim 5, wherein
   when occurrence of pre-ignition is not predicted by the pre-ignition prediction unit, the injection control unit causes first fuel to be injected in an intake stroke.

7. The engine control device according to claim 6, wherein
   the engine includes a hydraulically driven valve timing variable mechanism which changes an opening/closing timing of an intake valve.

8. The engine control device according to claim 5, wherein
   the engine includes a hydraulically driven valve timing variable mechanism which changes an opening/closing timing of an intake valve.

9. The engine control device according to claim 1, wherein
   when occurrence of pre-ignition is not predicted by the pre-ignition prediction unit, the injection control unit causes first fuel to be injected in an intake stroke.

10. The engine control device according to claim 9, wherein
    the engine includes a hydraulically driven valve timing variable mechanism which changes an opening/closing timing of an intake valve.

11. The engine control device according to claim 1, wherein
    the engine includes a hydraulically driven valve timing variable mechanism which changes an opening/closing timing of an intake valve.

* * * * *